US007856388B1

(12) United States Patent
Srivastava et al.

(10) Patent No.: US 7,856,388 B1
(45) Date of Patent: Dec. 21, 2010

(54) FINANCIAL REPORTING AND AUDITING AGENT WITH NET KNOWLEDGE FOR EXTENSIBLE BUSINESS REPORTING LANGUAGE

(75) Inventors: Rajendra P. Srivastava, Lawrence, KS (US); Miklos Vasarhelyi, New York, NY (US); Alex Kogan, East Brunswick, NJ (US)

(73) Assignee: University of Kansas, Lawrence, KS (US)

( * ) Notice: Subject to any disclaimer, the term of this patent is extended or adjusted under 35 U.S.C. 154(b) by 1024 days.

(21) Appl. No.: 10/914,619

(22) Filed: Aug. 9, 2004

Related U.S. Application Data

(60) Provisional application No. 60/493,505, filed on Aug. 8, 2003.

(51) Int. Cl.
*G06Q 40/00* (2006.01)
(52) U.S. Cl. ................................ 705/36 R; 705/35
(58) Field of Classification Search ............ 705/35, 705/37, 36 R
See application file for complete search history.

(56) References Cited

U.S. PATENT DOCUMENTS

| | | | | |
|---|---|---|---|---|
| 6,122,635 | A * | 9/2000 | Burakoff et al. | 707/102 |
| 6,336,094 | B1 * | 1/2002 | Ferguson et al. | 705/1 |
| 6,947,947 | B2 * | 9/2005 | Block et al. | 707/102 |
| 7,155,670 | B2 * | 12/2006 | Takizawa et al. | 715/239 |
| 7,653,871 | B2 * | 1/2010 | LaComb et al. | 715/227 |
| 2003/0041077 | A1 * | 2/2003 | Davis et al. | 707/500 |
| 2004/0193520 | A1 * | 9/2004 | LaComb et al. | 705/35 |
| 2004/0194009 | A1 * | 9/2004 | LaComb et al. | 715/500 |
| 2008/0229187 | A1 * | 9/2008 | Mahoney et al. | 715/234 |

OTHER PUBLICATIONS

Nelson, Kay M., Kogan, Alex, Srivastava, Rajendra P., Vasarhelyi, Miklos A., "Virtual Auditing Agents: the EDGAR Agent challenge," Decision Support Systems, May 2000, vol. 28, Issue 3, pp. 241-253.*

* cited by examiner

*Primary Examiner*—Charles R Kyle
*Assistant Examiner*—David L Wood
(74) *Attorney, Agent, or Firm*—Suiter Swantz PC LLO

(57) ABSTRACT

A system and method utilizes intelligent agents for searching, analyzing, and reporting business, financial, or non-financial information available through communication networks, particularly the Internet, regardless of inconsistencies in formats and granularity of that information. This information may then be used by users for financial and non-financial information for business decisions, developing risk profiles and credit worthiness. The intelligent agent may search Internet resources for business information of companies upon a user's request. The intelligent agent parses the retrieved information consisted with series of texts and identifies tables containing various financial statements. Each extracted table may be parsed into line items and every line item may be identified by matching to the appropriate XBRL taxonomy. Finally, the intelligent agent tags the information using XBRL taxonomy and generates financial statements in XBRL. The intelligent agent may be utilized to search through the internet for financial and non-financial information for business decisions, developing risk profiles and credit worthiness.

29 Claims, 6 Drawing Sheets

FINANCIAL REPORTING AND AUDITING AGENT WITH NET KNOWLEDGE FOR EXTENSIBLE BUSINESS REPORTING LANGUAGE

CROSS REFERENCE TO RELATED APPLICATION

The present application claims priority under 35 U.S.C. §119 to the U.S. Provisional Application Ser. No. 60/493,505, filed on Aug. 8, 2003, which is herein incorporated by reference in its entirety.

FIELD OF THE INVENTION

The present invention generally relates to the field of computer information systems, and particularly to a financial reporting, auditing and accounting information system that searches, analyzes, retrieves and reports business and financial information utilizing intelligent agents with communication network (e.g., Internet) knowledge.

BACKGROUND OF THE INVENTION

The development of the communication networks such as the Internet has exponentially increased the availability of information to consumers. Traditional auditing practices are limited to the verification and accuracy of financial reporting in business entities such as companies whose stock is publicly traded. However, the wide availability of financial information via the Internet has resulted in the need for provision of new types of accounting and auditing services such as real-time basis auditing for showing consumers how a company is performing, consulting services, and the like. These new types of services can be provided if business and financial information provided via the Internet can be effectively utilized.

Many business entities store business and financial information in their own internal systems and/or in publicly accessible databases such as the Electronic Data Gathering, Analysis, and Retrieval system (EDGAR). The U.S. Security and exchange commission (SEC) requires publicly traded business entities to file registration statements, periodic reports, and other forms electronically through EDGAR so that they are available to the general public. However, this information is often stored in widely varying formats and granularity, even between entities that use identical financial reporting software products. Such inconsistency in formats and granularity makes it difficult for business entities to share information reliably or cost effectively when performing many aspects of their business, including applying for credit, reconciling accounts, or reporting to investors, and the like.

Presently, there exists no information system that can universally analyze, retrieve and report business information available through Internet sources due to the non-standard format and inconstant accounting terms and formats of the available information. However, there have been efforts to standardize reporting. For example, standardized languages, particularly the eXtensible Business Reporting Language (XBRL) have been developed for delivering or reporting information in a consistent form. XBRL creates a vocabulary for describing exactly which bits of information are being included in a report, even to the point of taking regulatory jurisdiction and other variances into consideration. It is expected that use of XBRL may affect the format of the business information throughout the entire life cycle of that information, from the initial creation of invoices, orders, and other documents and actions, through the collection, aggregation, and reconciliation processing done in the financial departments, and eventually, to the reporting formats such as regulatory filings, statements, and corporate reports.

Consequently, it would be desirable to provide a system and method for searching, analyzing, and reporting business and financial information available through communication networks, particularly the Internet, regardless of inconsistencies in formats and granularity of that information. It would be also desirable to provide a system and method for generating financial information in a standard format so that users can share business and financial information reliably and cost effectively.

SUMMARY OF THE INVENTION

Accordingly, the present invention is directed to a system and method that utilizes intelligent agents for searching, analyzing, and reporting business and financial information available through communication networks, particularly the Internet, regardless of inconsistencies in formats and granularity of that information. This information may then be used by users for financial and non-financial information for business decisions, developing risk profiles and credit worthiness.

In a first specific embodiment, the present invention provides a system for generating financial statements for entities via a communication network such as the Internet, or the like. The system comprises an agent for generating financial statements for a business entity such as a company having stock traded in a public stock exchange, or the like. The agent receives name information for an entity for which the financial statement is desired and retrieves financial report information for the entity from a data source via the communication network. A knowledge base stores rules used by the agent for generating the financial statement. The agent identifies at least one table containing financial statement information from the retrieved financial report information for the entity and parses each identified table into table elements associating an identification tag such as an XBRL taxonomy tag, or the like, with at least one of the parsed table elements using the knowledge base. Financial statements for the entity may then be generated using table elements having an associated identification tags.

In a second specific embodiment, the present invention provides a method for generating financial statements for entities via a communication network such as the Internet, or the like. The method includes the steps of receiving name information for an entity for which a financial statement is desired; retrieving financial report information for the entity from a data source via the communication network; identifying at least one table containing financial statement information from the retrieved financial report information for the entity; parsing each identified table into table elements; associating an identification tag with at least one of the parsed table elements; and generating a financial statement for the entity using the table element having an associated identification tag.

In an advantageous aspect of the present invention, a web server provides one or more web pages for at least one of receiving input of name information for the entity from a user and allowing the user to view the financial statement generated by the agent in a desired format. Links may be provided for viewing the financial statements in various formats. In another advantageous aspect of the present invention, the intelligent agent may be utilized to search, analyze, and report business information which is available via the communication network (e.g., the Internet) regardless inconsistencies in formatting and granularity. In yet another advantageous aspect of the present invention, the present invention allows financial information to be provided in a standard format so that users can share business information reliably and cost effectively.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention provides a system and method for generating financial statements for business entities via a communication network such as the Internet. The system and method search the communication network (e.g., the Internet) for resources providing publicly available business and financial information of desired business entities such as publicly traded companies, or the like, including, but not limited to, financial reports filed with the SEC via the EDGAR system and retrieves this information. The retrieved information may then be stored on a local database for future offline query (i.e., with out access to the communication network). The text of the retrieved information is parsed and tables containing various financial statements (e.g., balance sheets, income statements, cash flow statements, and the like) are identified. Each identified table is then parsed into its various elements or line items and the line items identified by associating or matching the element or line item to an appropriate identification tag such as an XBRL taxonomy tag, or the like. The information tagged (e.g., using XBRL taxonomy) is used to generate financial statements (in XBRL where XBRL taxonomy is used). In exemplary embodiments, the system and method of the present invention use intelligent agent software. Generally, intelligent agents are defined as sets of instructions or programs that operate autonomously to accomplish unique tasks without direct human supervision. In this manner, the present invention provides new and innovative services to users and extends auditing practices beyond their traditional scope. Reference will now be made in detail to the presently preferred embodiments of the invention, examples of which are illustrated in the accompanying drawings.

Figure 1:
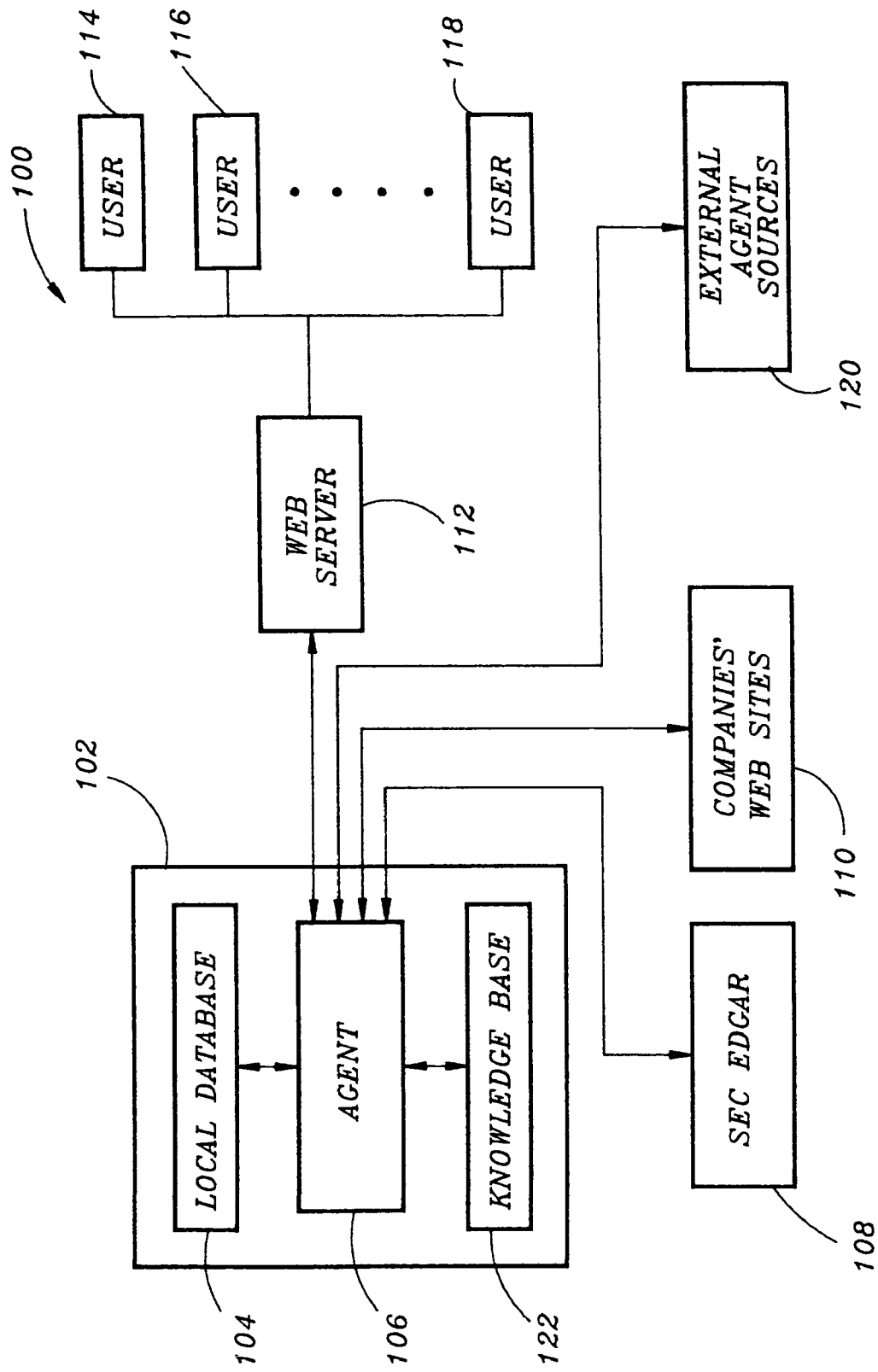
FIG. 1 is a block diagram illustrating a system for generating financial statements for entities via a communication network in accordance with an exemplary embodiment of the present invention.

Referring now to FIG. 1, a system for generating financial statements for business entities via a communication network such as the Internet is described. The system, hereinafter identified as a financial and auditing agent with net knowledge (FRAANK) information system 100 generates financial statements for entities via a communication network. The FRAANK information system 100 comprises an intelligent agent 106 and a local database 104. The intelligent agent 106 receives name information for an entity for which the financial statement is desired and retrieves financial report information for the entity from a data source via the communication network. The FRAANK system 100 employs a knowledge base 122 for storing rules used by the intelligent agent 106 for generating the financial statements. The intelligent agent 106 may identify at least one table containing financial statement information from the retrieved financial report information for the entity and parse each identified table into table elements associating an identification tag with at least one of the parsed table elements using the knowledge base 122. The financial statement for the entity may be generated using the table element having an associated identification tag. Further, a web server 112 may be communicatively connected to the FRAANK information system 100 and a plurality of user computer systems 114-118. A user may access the FRAANK information system 100 via active web pages supported by the web server 112. The FRAANK information system 100 may be communicatively connected to various internet resources 108-120 for retrieving publicly available entities' business information. An example of internet resources may include the Electronic Data Gathering, Analysis, and Retrieval system (EDGAR) 108, companies' websites 110, External agent sources 120, or the like.

The United States Security and exchange commission (SEC) requires companies to file registration statements, periodic reports, and other forms electronically through the EDGAR database 108. The EDGAR database 108 was designed to perform automated collection, validation, indexing, acceptance, and forwarding of submissions by companies and others who are required by law to file forms with the SEC. The EDGAR database's primary purpose is to increase the efficiency and fairness of the securities market for the benefit of investors, corporations, and the economy by accelerating the receipt, acceptance, dissemination, and analysis of time-sensitive corporate information filed with the agency. The FRAANK information system 100 may be utilized to search and analyze business information (e.g. 10K, 10Q or the like) provided by the EDGAR database 108. Thus, for example, an intelligent agent 106 in accordance with the present invention may search the EDGAR database 108 for current financial reports of company upon the request of a user. Such financial reports may include 10K reports, 10Q reports, or the like. The intelligent agent 108 parses the financial information text and identifies tables within the text containing financial statements. The intelligent agent 106 then further parses the identified tables into line items and identifies these elements or line items by associating each line item with the appropriate XBRL taxonomy. Finally, the intelligent agent 106 tags the information using XBRL taxonomy and generates financial statements in XBRL.

In an exemplary embodiment of the present invention, the intelligent agent 106 may include programming logic written in PERL, Knowledge Query Manipulation Language (KQML), JAVA and the like. The local database 104 and the knowledge base 122 may be implemented via an SQL database, with the internal communications implemented using open database connectivity (ODBC) over TCP/IP. It will be appreciated that the heterogeneity of the implementation is the result of choosing the most appropriate tool for each task. In the exemplary embodiment, the analysis and information extraction from natural text documents may be implemented in PERL and KQML while mobile applets that the FRAANK information system spawns may be written in JAVA.

Figure 2:
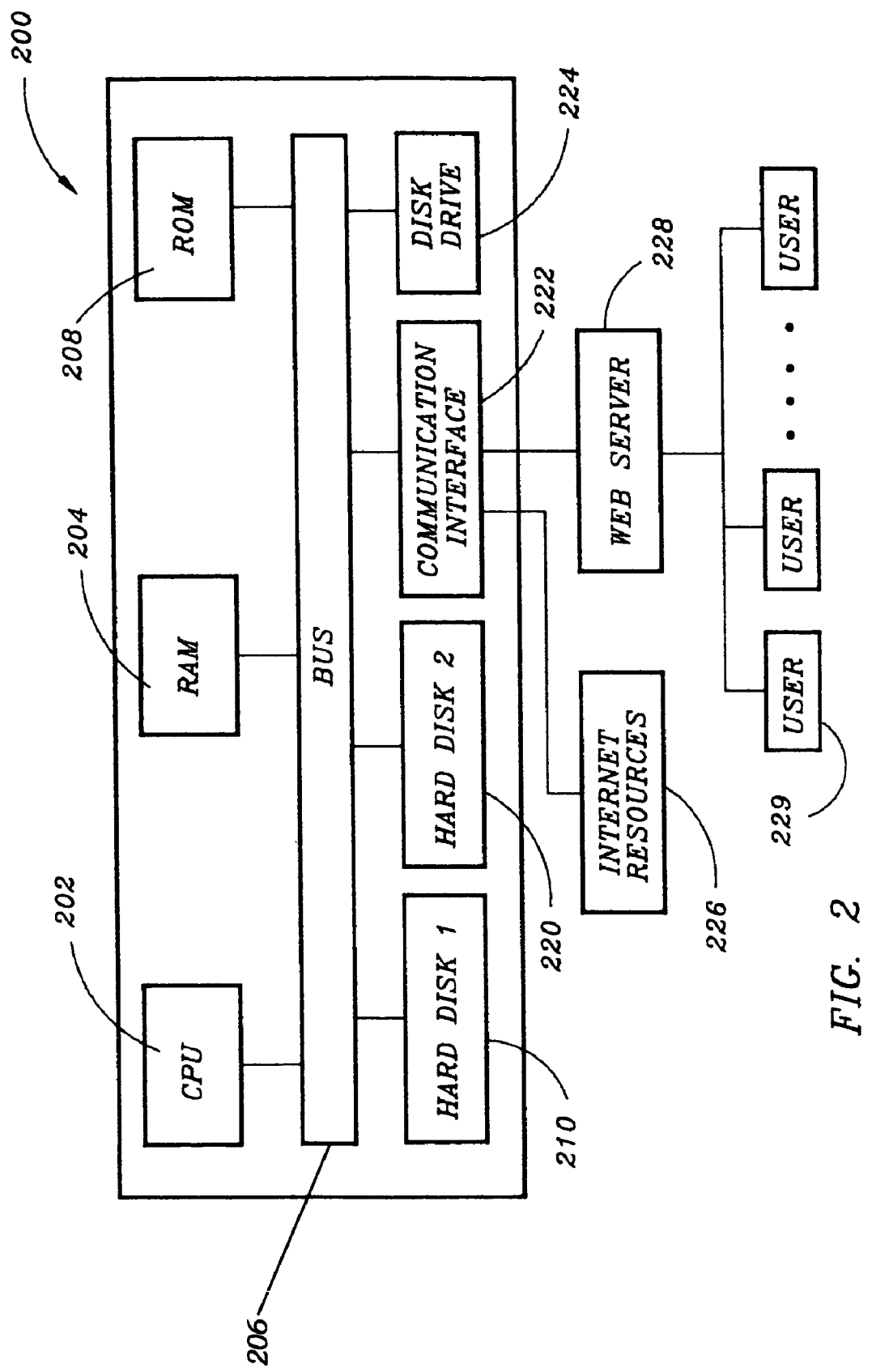
FIG. 2 is a block diagram illustrating a computer system capable of implementing the system shown in FIG. 1.

In exemplary embodiments, the FRAANK system may be implemented as sets of instructions or software readable by an information system device such as a computer system 200 illustrated in FIG. 2. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

Referring to FIG. 2, a block diagram illustrating a computer system 200 capable of implementing the FRAANK system is described. The computer system 200 may comprise a central processing unit (CPU) 202 for processing information, a disk drive (such as CD ROM drive, DVD drive, Floppy diskette drive and the like) 224, a communication interface 222 communicably connected to a Web server 228, Internet resources 226, or the like. The CPU 202, the disk drive 224, the communication interface 222 may be coupled via a bus 206 or the like. The computer system 200 may comprise a random access memory (RAM) 204. One example of RAM may be a dynamic RAM (DRAM), static RAM (SRAM), synchronous DRAM (SDRAM)) or the like. The computer system 200 further comprises read only memory (ROM) 208 (e.g., programmable ROM (PROM), erasable PROM (EPROM), and electrically erasable PROM (EEPROM)), a plurality of hard disk drives 210, 220 for storing a local database and a knowledge base. The users 229 may access the FRAANK information system via the Web server 228.

Figure 3:
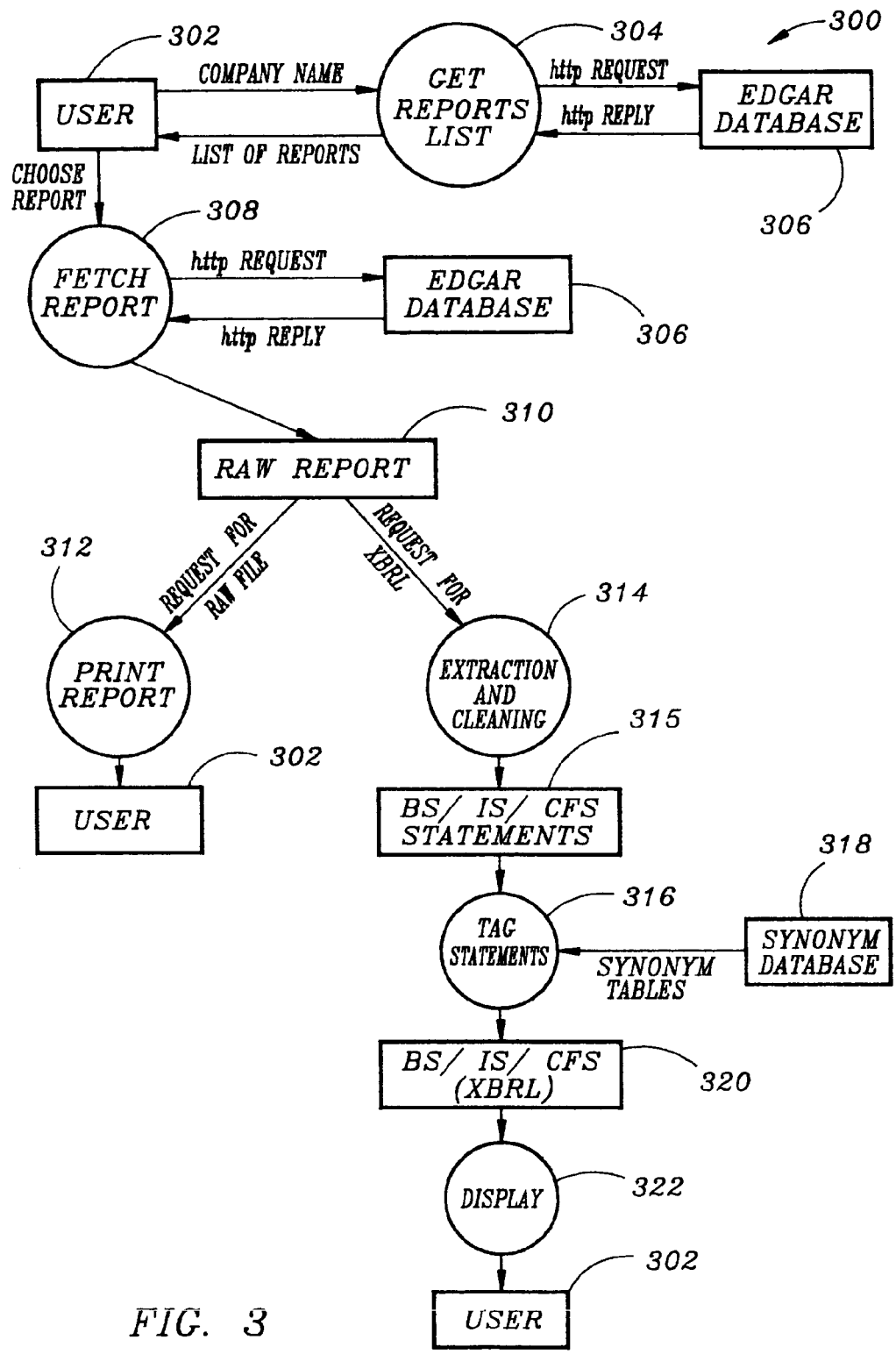
FIG. 3 is a data flow diagram describing modules of the system shown in FIG. 1, in accordance with an exemplary embodiment of the present invention.

Referring to FIG. 3, a method 300 used by the FRAANK information system 100 shown in FIG. 1, is described, wherein the FRAANK information system 100 is utilized to access the SEC's EDGAR database 108. However, it will be appreciated that information utilized by the FRAANK information system 100 is not limited to that provided by the EGAR database and the FRAANK information system may access various other Internet resources, including company websites, other financial websites, outside agents, or the like, in a similar fashion to retrieve financial or non-financial information.

Get Report List Module

As shown in FIG. 3, a user 302 may request a Get Report List Module 304 to get reports of a company. The Get Report List Module 304 may search business information from the EDGAR database 306 on the SEC web site. In one embodiment of the present invention, the Get Report List Module 304 takes the name of the company from the user and returns a list of reports filed by the company to the SEC. When the user does not enter an official name of the company, a list of companies and their Central Index Key (CIK) codes may be displayed on the screen. The CIK code is a unique number associated with each company in the EDGAR database 306. Alternatively, the Get Report List Module 304 intelligently determines whether the list of companies should be displayed. For example, if there is only one match for the company name entered by the user then the list of reports is directly displayed. In case of more than one match, a list of companies is displayed. The user selects the intended company from the list, and then the list of reports filed by the company is fetched based on the CIK code. Additionally, the user may select a particular kind of report. First, the module may search the local database of the system. The local database of the FRAANK information system may store all recently fetched reports to support an offline query. The offline query may be utilized to provide fast service. If the report is not found in the local database, the Get Report List module 304 may fetch the report from the EDGAR database 306 and store the fetched report on the local database. The Get Report List module 304 may check whether the report is an html file or a text file in order to use the appropriate extraction logic later on.

Figure 4A:
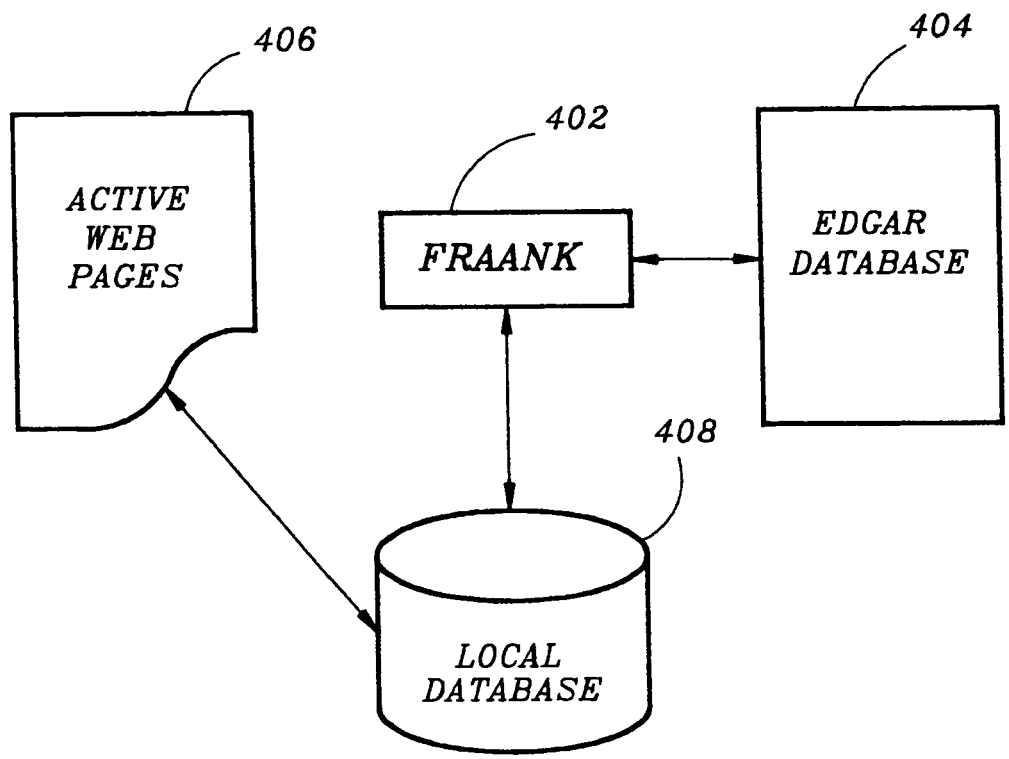
FIG. 4A is a block diagram illustrating an exemplary mode of retrieving a report in accordance with the present invention.
Figure 4B:
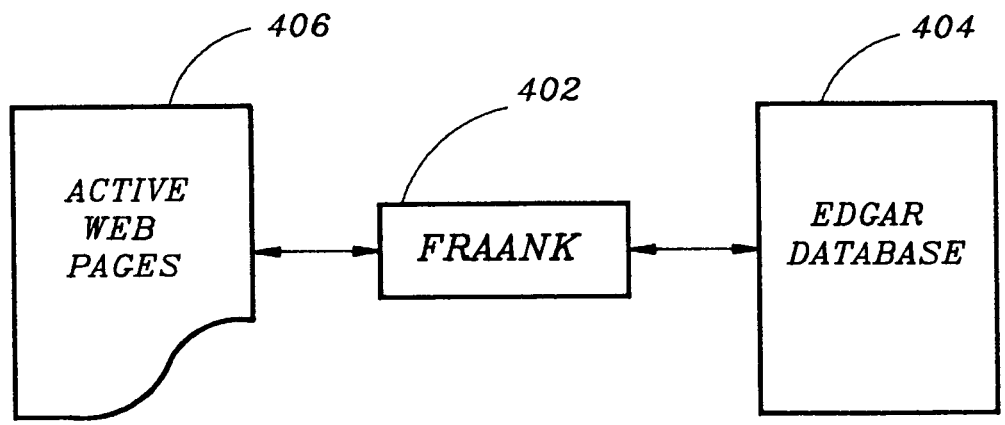
FIG. 4B is a block diagram illustrating a second exemplary mode of retrieving a report in accordance with the present invention.

Those of skill in the art will appreciate that there are numerous ways to utilize the FRAANK information system to provide reports. Referring to FIG. 4A, the FRAANK information system 402 may fetch business information from a database system such as the EDGAR database 404 periodically and save the fetched information on a local database 408. Thus, the EDGAR database 404 and the FRAANK information system 402 may not have to communicate at the time when the user receives the report. A user may have reports directly from the local database 408 via active web pages 406. This example may be close to the above described offline query. Referring now to FIG. 4B, the FRAANK information system 402 may provide raw reports online from a database system such as the EDGAR database 404.

In a particular embodiment of the present invention, the Get Report List Module 304 may be implemented by various PERL modules and programs. For example, LWP:: UserAgent perl module may be used to fetch HTTP pages from the SEC website. Get_Report.pl may be a main program that is called when the user enters the company name. It is also called when the user selects the correct company from a list of possible matches. Get_Cik_Code.pl may be a program that takes the company name entered by the user and returns a list of company names and CIK codes that may match it. Get_Report_List.pl may be a program that fetches the list of reports filed by the company.

Fetch_Report.pl may be used to fetch a report from the SEC website. Text_exist.pl may be used to search for a report on the local server before fetching the report from the SEC website. Header_Footer.pl may be used to print common html header and footer tags on all resulted pages. Those of skill in the art will appreciate that various other programs, functional modules, and the like may be used to implement the Get Report List Module 304 without departing from the scope and intent of the present invention.

Referring again to FIG. 3, the user 302 may choose to receive a raw report from the EDGAR database 306. In such a case, a Print Report module 312 may print the raw report 310 to the user. Additionally, the user may choose to receive an eXtensible Business Reporting Language (XBRL) formatted report. XBRL formatted reports may offer advantages to a user. XBRL has been developed for delivering or reporting information in a consistent form with a vocabulary for describing exactly which parts of business information are being included in a report, even to the point of taking regulatory jurisdiction and other variances into consideration. It is expected that XBRL may affect the format of the business information throughout the entire life cycle of that information, from the initial creation of invoices, orders, and other documents and actions, through the collection, aggregation, and reconciliation processing done in the financial departments, and eventually, to the reporting formats such as regulatory filings, statements, and corporate reports.

Extraction and Cleaning Module

Figure 5:
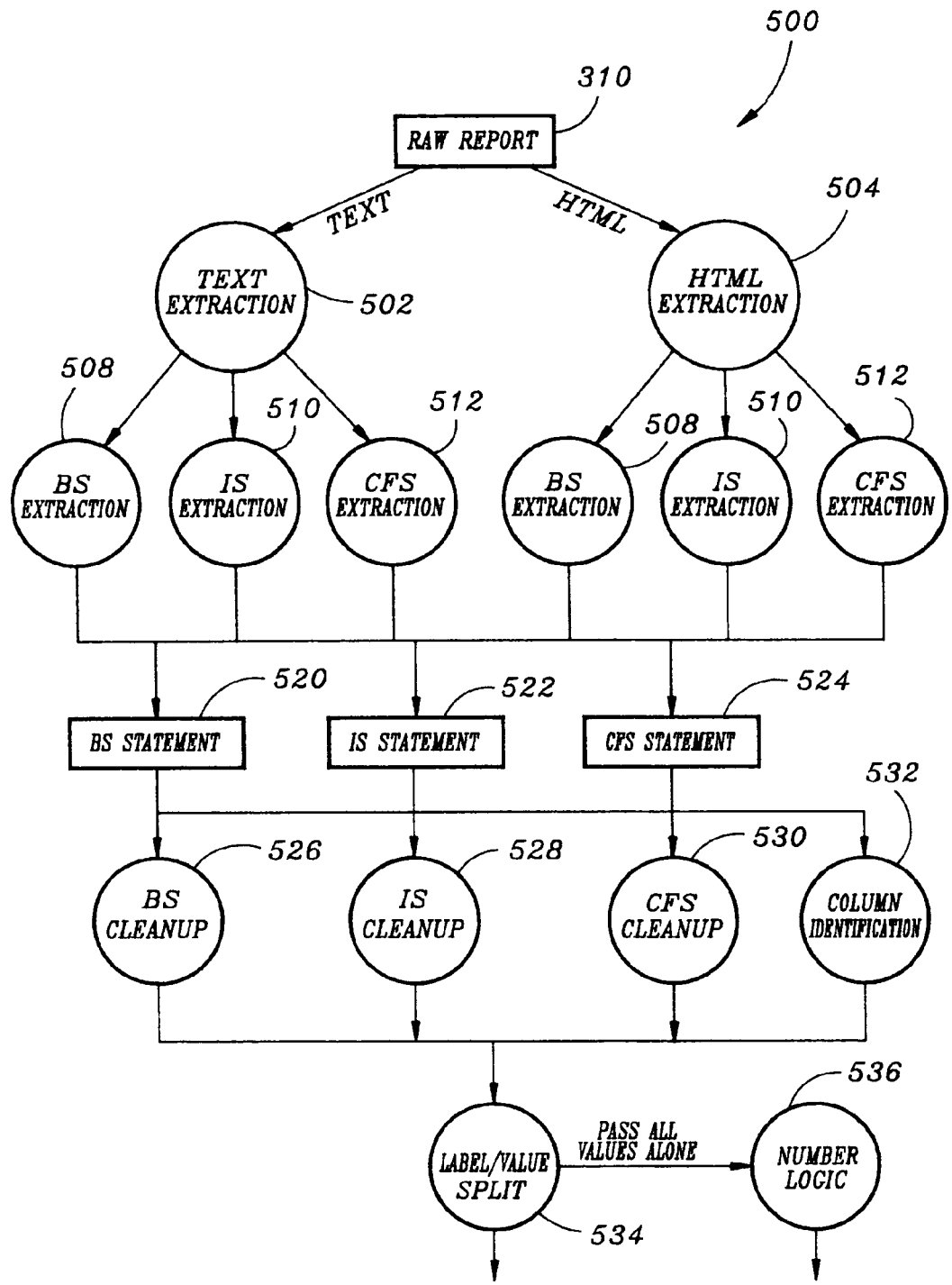
FIG. 5 is a data flow diagram describing an Extraction and Cleaning Module of the intelligent agent of the system shown in FIG. 1, in accordance with an exemplary embodiment of the present invention.

When the user desires to have an XBRL formatted report, the FRAANK information system may execute an Extraction and Cleaning module 314. The Extraction and Cleaning module 314 may create three financial statements 315 including a business statement, an income statement, and a cash flow statement from the raw report 310. The created financial statements may be stored locally on the server for further processing. The Extraction and Cleaning module 314 cleans each of the financial statements by removing unwanted lines in financial tables, extraneous information not desired by the user, and the like. Referring now to FIG. 5, a detailed data flow diagram 500 for the Extraction and Cleaning module is shown. The raw report 310 may be a natural text document or an html document. However the raw report 310 should be parsed in order to generate an XBRL formatted report. For example, when the raw report 310 is a text document, Text Extract logic 504 may start a first parse over the raw report 310.

In the first parse, the text document (e.g. the raw report) may be searched for a table tag (e.g. "<table>"). Once a table tag is found, the Text Extract logic 502 may search for predetermined phrases which are often used to indicate a certain financial statement. For example, "Consolidated Balance Sheets" may be searched because it is often used to signify a balance sheet. A collection of predetermined phrases may be matched to check whether each financial statement is found correctly. Along with the predetermined phrase match, lines that follow the predetermined phrases are checked for whether they actually constitute a part of a table. For instance, some values (numbers) at the end of a line and date information may constitute a part of a table. The date information may be used to signify the year for which values may have been reported. Additionally, the Text Extract logic 502 may check the presence of certain keywords (or phrases) in order to verify whether the table is a correct financial statement. For example, in case of a balance sheet, a keyword "Asset" must be present. Otherwise, the table may not be a correct balance sheet. The Text Extract logic 502 may search for a tag indicating the end of a table. For instance, the end of the table tag may be recognized by finding a "</table>" tag. Once the Text Extract logic 502 determines the start-point and end-point of the table, the Text Extract logic 502 may perform an additional check to verify if the entire financial statement is captured correctly. For example, in the case of a balance sheet, the Text Extract logic 502 may look for lines that contain a certain phrase such as "total liabilities and stockholder's equity" or the like. In some cases, the keyword "continued" is used to represent that the statement has been broken into more than one table for formatting purposes. If the end-point is found to be in correct, the lines following the end-point are searched for the phrase that matches at the start point.

During the first parse, the Text Extract logic 502 may fail to find table tags when the financial statement is represented by phrases instead of table tags. In such a case, the financial statement may be extracted in a second phase. The Text Extract logic 502 may determine the start-point and end-point of the financial statement by looking for predetermined phrases and keywords as described above. As a result of the first and second parses, the information of each financial statement 508, 510, 512, such as units information or the like may be captured between the start of a financial statement and the start of line items.

When the raw report 310 is an html document, HTML Extract logic 504 may be used. The HTML Extract logic 504 may be implemented in a manner similar to the Text Extract logic 502 with minor differences. For example, financial reports in html forms may have a table tag which is similar to the table tag described in the first parse of the Text Extraction logic 502. The HTML Extract logic 504 searches for a table tag over the raw report. Once a table tag is found, text around the table tag is stripped of any html tags. The lines of the text are then checked for the predetermined phrase that identifies the corresponding financial statement. The end-point of the financial statement is found using the end of table tag "</table>". After the start-point and end-point are found, additional logic is used to test if the correct statement has been captured (this logic may be similar to the one used in the text extraction logic). Once the correct start-point and end-points are found and the html tags have been stripped, the HTML Extract logic 504 may create a text version of the table and stores the text version of the table in a local memory. In an embodiment of the present invention, the logic for the html parser assumes that the tables use html tags such as "<td>" tags to represent cells and "<tr>" tags to represent rows. In some html reports, the tables are not represented with normal "<table>" html tags, but with plain texts. In order to extract such statements, the HTML Extract logic 506 may use the above described Text Extraction logic 502 (e.g. for the second parse). In both cases, the information of each financial statement 508, 510, 512, such as units information or the like may be captured between the start of a financial statement and the start of line items.

In an exemplary embodiment of the present invention, the HTML Extract logic 504 and the Text Extract logic 502 may be implemented by various PERL modules and programs. A Data::Dumper perl module may be used to print out contents of data structures for debugging purposes. HTML::Parser && HTML::Entities perl modules may be used to parse html documents. Extract_And_Tag.pl is a program that calls the actual extraction programs. It maintains all the data structures required by the Extraction and Tagging Module. Extract_Balance.pl is a program that extracts the balance sheet from text reports and also html reports (that do not use html tags to represent the tables). Extract_Cashflow.pl is a program extracts the cash flow statement from text reports and also html reports (that do not use html tags to represent the tables). Extract_Income.pl is a program that extracts the income statement from text reports and also html reports (that do not use html tags to represent the tables). Html_Extract_Balance.pl is a program that extracts the balance sheet from html reports. Html_Extract_Cashflowpl is a program that extracts the cash flow statement from html reports. Html_Extract_Income.pl is a program that extracts the income statement from html reports. Remove Html_Tags-Table.pl is a program that removes the html tags from the tables. Remove Html_Tags Head.pl is a program that removes html tags of the lines above a table tag. Those of skill in the art will appreciate that various other programs, functional modules, and the like may be used to extract text and data without departing from the scope and intent of the present invention.

Column Identification Module

A Column Identification module 532 is used to identify a correct column (or a current column) of values in a financial statement. Inputs to the Column Identification module 532 may include a date of a report, a reference to Notes Flag Variable, a reference to a report array, a value line number, a number of Standard Generalized Markup Language (SGML) column tags and the like. A line number indicates where values are located. The line numbers may be determined during the above described extraction phases. Using the line number, the Column Identification module 532 may calculate the number of values. Starting from the value line number, the report may be screened to locate lines which contain date information instead of values. An example of date information may be "1999", "2000" or the like. The Notes Flag may be set if the line contains a keyword such as "notes" or the like.

The Column Identification module 532 may count the number of years present on the line that contains date information and then update a period array which stores date information of the financial statement. The Column Identification module 532 may check whether the number of values is equal to the number of years. If the number of years is less than the number of values, the Column Identification module 532 may check whether a SGML column tag variable is set and compare the column tag count and the value count. If the SGML column tag is set and the value count is equal to the column tag count, then the Column Identification module 532 assumes that the number of years is incorrect. Additional year information may be parsed from a line found to have year information previously (the period array may be modified accordingly). If either the SGML column tag is not set or the value count is not equal to the column tag count, then the Column Identification module 532 may verify the value count on additional line items. If the number of values is equal to the number of years, then the module may search for additional year information. The period array may be updated accordingly.

If the number of years found is greater than the number of values found, the module checks whether the SGML column tag is set and the column tag count is equal to the value count. If the SGML column tag is set and the column tag and the value count are equal, the module may assume that the year information is incorrect. Thus, the module may remove the additional year information from the period array. If either the SGML column tag is not set or the value count is not equal to the column tag count, then the Column Identification module 532 verifies the value count on additional line items. If the number of values is equal to the number of years, additional years are removed from the period array. Eventually, the correct number of years may be found. The module searches for the latest column of values by finding the biggest element in the period array. If more than one element has been found to have same values, then the module looks for month information and determines the latest column. In an embodiment of the present invention, the program that performs the task of this module is Column-10k.pl.

Cleanup Modules

Generally, Cleanup modules may remove lines that are blank or just have periods, equal signs, hyphens or the like from the financial statements and passes outputs (the cleaned financial statement) to a Label-Value Split Module 534. The Cleanup modules may include a Balance Sheet Cleanup module 526, an Income Statement Cleanup module 528, a Cash Flow Statement Cleanup module 530. Each cleanup module may include steps of a) General Cleanup, b) Identifying the Start of the statement, c) Identifying the end of the statement, d) Identifying Headings, e) Cleaning in between, f) Handling multiple lines, g) Capital multiple lines with indentation, h) Capital lines with punctuations at the beginning or end, and i) Finalizing the cleanup.

Balance Sheet Cleanup Module

The Balance Sheet Cleanup Module (BS Cleanup module) 526 may be started with a step of opening a headings file and saving all headings in a headings array. The BS Cleanup module 526 initializes a variable "start" to be −1 and "start" is saved at the last line of the headings file.

a) General Clean Up

In case of normal lines, the BS Cleanup module 526 may perform an exemplary general clean up procedure. The BS Cleanup module 526 may ignore lines that are blank or just have periods, equal signs, hyphens or the like. The BS Cleanup module 526 may remove year information found in assets and liabilities sections. For example, "ASSETS 2000 1999" is replaced with "ASSETS". Foot notes may be removed and tagged as foot notes. The module may remove words such as "millions", "thousands" or the like. Tabs may be replaced with arbitrary number of spaces. For example, 4 spaces may be used for a tab character. The module may replace a dollar sign, a comma, '=', '-', quotes, a period space combination or the like. The period space combination may be removed to eliminate confusion with a period (a dot) at the end of a line item. The BS Cleanup module 526 may remove consecutive periods ('.') and bars ('-'). Preferably, the consecutive periods include at least three periods. For example, "Current assets . . . 45" may be replaced with "Current assets 45." Accordingly, the BS Cleanup module 526 removes meaningless periods. Spaces between brackets may also be removed. The BS Cleanup module 526 may delete any lines with continued " . . . " that indicate a next page. After the general clean up is done, the BS Cleanup module 526 may copy cleaned lines to a temporary array which may be utilized through out the FRAANK information system.

b) Identifying the Start of a Balance Sheet

The BS Cleanup module 526 may identify a start of a balance sheet statement by detecting predetermined phrases. For example, the BS Cleanup module 526 may check if the balance sheet starts with "current assets" or "current." If it does not start with "current assets", the module may look for "Cash and cash equivalents" or "Cash". If any of the above phrases is not found, the module may take the first line which has values in the balance sheet as the start of the balance sheet. In an embodiment of the present invention, the BS Cleanup module 526 assumes that any line with values would have a pattern in which a digit is followed by at least 2 spaces and another digit. The BS Cleanup module 526 may make sure that the digits do not represent year information. The BS Cleanup module 526 may append a term such as "ASSETS" at the start of the balance sheet if the balance sheet does not have a term "ASSET."

c) Identifying the End of a Balance Sheet

The BS Cleanup module 526 may identify an end of the balance sheet. From the end of the balance sheet, the BS Cleanup module 526 may check if there are accompanying notes. In such cases, the BS Cleanup module 526 may delete all the lines from the end of the balance sheet until the line that has a value is found. The BS Cleanup module 526 may check whether there are multiple columns of values. For example, if the line starts with a small letter (one of [a-z]) and the line is not a note, then the module may assume that there are multiple columns of values (at least 2 columns of values).

d) Identifying Headings

The BS Cleanup module 526 may identify headings by checking whether a line item has a colon at the end of the line since a line item having a colon may typically be a heading. If the line starts with a small letter, it may indicate that the line item is a part of a multiple line heading. The BS Cleanup module 526 concatenates previous lines and the line item having a small letter. Preferably, the BS Cleanup module 526 assumes that the multiple line heading may not exceed three lines. The BS Cleanup module 526 may remove brackets, standard punctuations and the like. The line item may be checked for determining whether the line item is a standard heading. Multiple line headings may be handled in this step. For example, when a current line starts with a capital letter and a previous line also start with a capital letter, both lines individually may not be headings. In such a case, the previous lines are concatenated into the current line. The BS Cleanup module 526 carefully screens lines which are not headings but have a colon at the end such as "Accounts receivable" line items.

e) Cleaning in Between

A table may be found to be split in a financial statement. In an embodiment of the present invention, the BS Cleanup module 526 may assume that a table is split when the module finds a "</table>" phrase in between the start-point and the end-point of the balance sheet. Alternatively, the BS Cleanup module 526 may assume that the table is split when the module finds "See accompanying notes" in between the start-point and the end-point of the balance sheet. Once such a line has been found, the BS Cleanup module 526 may delete all lines following the line until the module finds a line that contains a digit (a value). The BS Cleanup module 526 may determine whether the digit does not represent year information or the line does not contain words such as "millions", "thousands", or the like. The BS Cleanup module 526 may handle various cases intelligently. For example, when multiple lines come before the digit line (the line containing a digit), the BS Cleanup module 526 may maintain the two end-points. As a result, the BS Cleanup module 526 may delete all lines in between the start-point and the end-point of the balance sheet, excepting headings and the multiple lines associated with the end-point line item.

f) Multiple Lines

The BS Cleanup module 526 may utilize separate logic for handling multiple lines. Multiple lines may be found in a Common Stock section, a preferred stock section, or the like, where the section generally extends to 4-5 lines. A first logic may be used to handle general multiple lines. A second logic may be used for special multiple lines such as Common Stock sections. The second logic may be necessary since there are many inconsistencies in formats of Common stock sections among companies. For example, some Common Stock Sections may contain unusual spacing in labels. Such lines will be split into labels and values based on spaces. Furthermore, some companies use a capital letter for certain terms although lines may not start with the terms. For example, "Issued", "Authorized" and the like are commonly found terms with capital letters in Common stock sections.

The BS Cleanup module 526 skips headings and checks if the line starts with predetermined terms such as "common", "treasury", "preferred" or the like and if the next line also starts with one of the predetermined terms. Occasionally, the common stock and treasury stock lines sections may comprise single lines. When the common stock and treasury stock lines sections are multiple lines, the BS Cleanup module 526 sets a variable called MORE_THAN_ONE_LINE. Next, the module starts deleting the excess spaces in labels. The BS Cleanup module 526 may split the line item based on three or more spaces between digits. The BS Cleanup module 526 checks whether the line is a normal line and then assumes that latter part of the normal line contains only numbers. If the line contains numbers and letters, the label may be incorrect such as having 5-6 spaces in between some words. In such a case, the BS Cleanup module 526 may remove the excess spaces. Finally, the spaces, which were removed, may be added to the original spaces. If the spaces are not added back to the text, it may affect the logic when multiple lines are found.

The above procedure of replacing excess spaces with labels may be done only for the line which contains a predetermined phrase such as "Common", "Preferred" or the like. For the rest of the lines, the BS Cleanup module 526 may use the steps as follow:

1) Replace excess spaces in labels
2) If the subsequent lines start with capital letters and do not contain "Issued", "Authorized", "Shares" or date information, assume that the end-point of the multiple lines has been found. Go to step 1)
3) If it has gone through the loop at least once, then MORE_THAN_ONE_LINE may be set to 1 indicating the multiple lines is really more than one line
4) The BS Cleanup module 526 may utilize two terms in the loop. The first term corresponds to the start of multiple lines, and the second term corresponds to the last line of multiple lines
5) Find if the multiple lines have values set or not
6) If a value is present at the start or end of multiple lines, or no value is present at all, concatenate all lines from start+1 to end. The start of multiple lines may not be included since a value present in the first line may be placed in the middle of the label after the concatenation
7) If the condition in step 6) fails, then the BS Cleanup module 526 assumes that a value may be somewhere in between the start and end of multiple lines. In that case, the module removes the value part from the line which has the value and concatenates the rest. Finally, the BS Cleanup module 526 appends the value part to the end of the multiple lines.

VALUE_PART_CONCATENATION may be implemented by the steps as follow:

1) If a value is present at the beginning, set a variable called CapSet to 1.
2) If Capset=0 and MORE_THAN_ONE_LINE=1, it means that the value is present at the end and it is a multiple line. If the value is present at the end, a simple concatenation is performed. Concatenate all the text.
3) If Capset=1, and MORE_THAN_ONE_LINE=1, it means that the value is present at the start of a line and the multiple line. Separate the label part from the first line and then concatenate the rest. Append the value part to the concatenated text
4) If MORE_THAN_ONE_LINE=0, it means it is a single line. No need to concatenate.

Other logic may be used for normal multiple lines. The BS Cleanup module 526 assumes that the second part of multiple lines would have punctuations or space combination followed by small letters and the previous line and the current line are not headings. In some cases, the second part of multiple lines may start with digits. The BS Cleanup module 526 may check for a line having values without any label attached. For example, in "Accounts receivable", the line may include date information (e.g. 2000, 1999, or the like) which is not a value. Then, the BS Cleanup module 526 finds where values are present (1st part or last part of multiple lines). The BS Cleanup module 526 also determines whether there are nested multiple lines (i.e. multiple lines in multiple lines). In such a case, the above described steps may be implemented to the nested multiple lines. If values are present at the end of the multiple lines, the multiple lines may be concatenated. If values are present at the start, then the value part may be removed. All text is concatenated first and then the values are appended at the end.

g) Capital Multiple Lines with Indentation

Capital Multiple Lines with Indentation logic is used, when the BS Cleanup module 526 finds that the second part of multiple lines starts with a capital letter but has an indentation from the previous line. For example, Accounts receivable
  Less for doubtful accounts 200 500.

In this case, "Less" starts with a capital letter. Thus, the line containing "Less" may not be detected as a part of multiple lines in the Normal multiple lines logic. The Capital Multiple Lines with Indentation logic may check if a line starts with a capital letter and not a heading. The length from start and the length from start of the previous line may be found. If the current line has more indentations than the previous line, then the Capital Multiple Lines with Indentation logic may concatenate the current line to the previous line. The Capital Multiple Lines with Indentation logic assumes that the value is present at the end of the multiple lines. The Capital Multiple Lines with Indentation logic concatenates all subsequent lines, until the current line has fewer indentations than the previous line.

h) Capital Lines with Punctuations at Beginning or End

The BS Cleanup module 526 may use Capital Lines with Punctuations at Beginning or End (CLPBE) logic for line items which have the first part of multiple lines ending with punctuations or the second part of the multiple lines ending with punctuations. The CLPBE logic may have to split labels and values to check that there is a conjunction at the end of label. For example, Cash and cash equivalents at
  Beginning of the year 200 500

Cash and cash equivalents 4300 130.
  At end of year

To handle such cases, the CLPBE logic may perform the steps as follows:
  1) Go into the first part if loop has succeeded. Go to the second part otherwise. Two lines which start with capital letters are found and there is no indentation difference.
  2) Detect the pattern. If the pattern is found, do the following:
  3) If a value is present at the end, just concatenate lines.
  4) If a value is present at the start, concatenate all labels and append the value at the end.

i) Finalizing the Cleanup

The module may copy a line to a new array if the line is not blank. When the module finds the label in the line, the module may remove starting spaces.

CFS Cleanup Module

The Cash Flow Statement (CFS) cleanup module 530 may be started with a step of opening the headings file and saving all headings in a headings array. The CFS cleanup module 530 initializes a variable "start" to be −1 and "start" be saved at the last line of the file.

a) General Clean Up

In the case of normal text lines, the CFS cleanup module 530 may perform an exemplary general clean up procedure. The CFS cleanup module 530 may ignore lines that are blank or just have periods, equal signs, hyphens or the like. A general cleaning logic is explained by various rules which are part of a knowledge base. The CFS cleanup module 530 may remove foot notes which will be tagged later on. The CFS cleanup module 530 may remove all lines that contain words such as "millions", "thousands" or the like. Tabs may be replaced with some arbitrary spaces. For example, 4 spaces may be used for a tab character. The module may replace a dollar sign, a comma, '=', '-', quotes, a period space combination or the like. The period space combination is removed to eliminate confusion with a period (a dot) at the end of a line item. The CFS cleanup module 530 may remove consecutive periods ('.') and bars ('-'). Preferably, the consecutive periods include at least three periods. For example, "Current assets . . . 45" may be replaced with "Current assets 45." Accordingly, the CFS cleanup module 530 removes meaningless periods. Spaces between brackets may be removed. The CFS cleanup module 530 may delete any lines with continued " . . . " that indicate a next page. After the general clean up is done, the CFS cleanup module 530 may copy cleaned lines to a temporary array which may be used throughout the FRAANK information system.

b) Identifying the Start of CFS

The module may check if the CFS starts with "operat"% (e.g. "operating", "operation", or the like wherein the % character is a wildcard character or the like). If it does not start with "operations", "operating activities", or the like, the module may look for "Net Income" or "Income". If any of the above is not present, the module may take the first line as the start of CFS, which has values which are not year information.

c) Identifying the End of CFS

The module may identify an end of the CFS. From the end of the CFS, the module may check if there are accompanying notes. In such cases, the module may delete all the lines from the end of the CFS until the line that has a value is found. The CFS cleanup module 530 may check whether there are multiple columns of values. For example, if the line starts with a small letter (one of [a-z]) and the line is not a note, then the module may assume that there are multiple columns of values (at least 2 columns of values).

d) Identifying Headings

The CFS cleanup module 530 may identify headings by checking whether a line item has a colon at the end of the line since a line item with a colon is usually a heading. If the line starts with a small letter, it may indicate that the line item is a part of a multiple line heading. The CFS cleanup module 530 concatenates previous lines and the line item. Preferably, the CFS Cleanup module 530 assumes that the multiple line heading may not exceed 3 lines. The CFS Cleanup module 530 may remove brackets, standard punctuations and the like. The line item is checked whether the line item is a standard heading. Multiple line headings may be handled in this step. For example, when a current line starts with a capital letter and a previous line also starts with a capital letter, both lines individually may not be headings. In such a case, the previous lines are concatenated into the current line. The CFS Cleanup module 530 carefully screens some lines which are not headings but have a colon such as Accounts receivable line items.

e) Cleaning in Between

A table may be found to be split in a financial statement. In an embodiment of the present invention, the CFS Cleanup module 530 may assume that a table is split when the module finds a "</table>" phrase in between a start-point and an end-point of the balance sheet. Alternatively, the CFS Cleanup module 530 may assume that the table is split when the module finds "See accompanying notes" in between a start-point and an end-point of the balance sheet. Once the CFS Cleanup module 530 has found such a line, the CFS Cleanup module 530 may delete all lines following the line until the module finds a line that contains a digit (a value). The CFS Cleanup module 530 may determine whether the digit does not represent year information or the line dose not contain words such as "millions", "thousands", or the like. The CFS Cleanup module 530 may handle various cases intelligently. For example, when multiple lines come before the digit line (the line containing a digit), the CFS Cleanup module 530 may maintain the two end-points. As a result, the CFS Cleanup module 530 may delete all lines in between the start-point and the end-point of the balance sheet but for headings and the multiple lines associated with the end-point line item.

f) Multiple Lines

The CFS Cleanup module 530 may utilize separate logic for handling multiple lines. Multiple lines may be found in a Common Stock section, a preferred stock section, or the like, where the section generally extends to 4-5 lines. A first logic may be used to handle general multiple lines. A second logic may be used for special multiple lines such as Common Stock sections. The second logic may be necessary since there are many inconsistencies in formats of Common stock sections among companies. For example, some Common Stock Sections may contain unusual spacing in labels. Such lines will be split into labels and values based on spaces. Furthermore, some companies use a capital letter for certain terms although lines may not start with the terms. For example, "Issued", "Authorized" and the like are commonly found terms with capital letters in Common stock sections.

The CFS Cleanup module 530 skips headings and checks if the line starts with predetermined terms such as "common", "treasury", "preferred" or the like and if the next line also starts with one of the predetermined terms. Occasionally, the common stock and treasury stock lines sections may comprise single lines. When the common stock and treasury stock lines sections are multiple lines, the CFS Cleanup module 530 sets a variable called MORE_THAN_ONE_LINE. Next, the module starts deleting the excess spaces in labels. The CFS Cleanup module 530 may split the line item based on three or more spaces between digits. The CFS Cleanup module 530 checks whether the line is a normal line and then assumes that the latter part of the normal line contains only numbers. If the line contains numbers and letters, the label may be incorrect such as having 5-6 spaces in between some words. In such a case, the CFS Cleanup module 530 may remove the excess spaces. Finally, the spaces, which were removed, may be added to the original spaces. If the spaces are not added back to the text, it may affect the logic when multiple lines are found.

The above procedure of replacing excess spaces with labels may be done only for the line which contains a predetermined phrase such as "Common", "Preferred" or the like. For the rest of the lines, the CFS Cleanup module 530 may use the steps as follow:

1) Replace excess spaces in labels
2) If the subsequent lines start with capital letters and do not contain "Issued", "Authorized", "Shares" or date information, assume that the end-point of the multiple lines has been found. Go to step 1)
3) If it has gone through the loop at least once, then MORE_THAN_ONE_LINE may be set to 1 indicating the multiple lines is really more than one line
4) The CFS Cleanup module 530 may utilize two terms in the loop. The first term corresponds to the start of multiple lines, and the second term corresponds to the last line of multiple lines
5) Find if the multiple lines have values set or not
6) If a value is present at the start or end of multiple lines, or no value is present at all, concatenate all lines from start+1 to end. The start of multiple lines may not be included since a value present in the first line may be placed in the middle of the label after the concatenation
7) If the condition in step 6) fails, then the CFS Cleanup module 530 assumes that a value may be somewhere in between the start and end of multiple lines. In that case, the module removes the value part from the line which has the value and concatenates the rest. Finally, the CFS Cleanup module 530 appends the value part to the end of the multiple lines.

VALUE_PART_CONCATENATION may be implemented by steps as follow:

5) If a value is present at the beginning, set a variable called CapSet to 1.
6) If Capset=0 and MORE_THAN_ONE_LINE=1, it means that the value is present at the end and it is a multiple line. If the value is present at the end, a simple concatenation is performed. Concatenate all the text.
7) If Capset=1, and MORE_THAN_ONE_LINE=1, it means that the value is present at the start of line and the multiple line. Separate the label part from the first line and then concatenate the rest. Append the value part to the concatenated text
8) If MORE_THAN_ONE_LINE=0, it means it is a single line. No need to concatenate.

Other logic may be used for normal multiple lines. The CFS Cleanup module 530 assumes that the second part of multiple lines would have punctuations or space combination followed by small letters and the previous line and the current line are not headings. In some cases, the second part of multiple lines may start with digits. The CFS Cleanup module 530 may check for a line having values without any label attached. For example, in "Accounts receivable", lines may include date information (e.g. 2000, 1999, or the like) which is not a value. Then, the CFS Cleanup module 530 finds where values are present (1st part or last part of multiple lines). The CFS Cleanup module 530 also determines whether there are nested multiple lines (i.e. multiple lines in multiple lines). In such a case, the above described steps may be implemented to the nested multiple lines. If values are present at the end of the multiple lines, the multiple lines may be concatenated. If values are present at the start, then the value part may be removed. All text is concatenated first and then the values are appended at the end.

g) Capital Multiple Lines with Indentation

Capital Multiple Lines with Indentation logic is used, when the CFS Cleanup module 530 finds that the second part of multiple lines starts with a capital letter but has an indentation from the previous line. For example, Accounts receivable
Less for doubtful accounts 200 500.

In this case, "Less" starts with a capital letter. Thus, the line containing "Less" may not be detected as a part of multiple lines in the Normal multiple lines logic. The Capital Multiple Lines with Indentation logic may check if a line starts with capital letter and not a heading. The length from start and the length from start of the previous line may be found. If the current line has more indentations than the previous line, then the Capital Multiple Lines with Indentation logic may concatenate the current line to the previous line. The Capital Multiple Lines with Indentation logic assumes that the value is present at the end of the multiple lines. The Capital Multiple Lines with Indentation logic concatenates all subsequent lines, until the current line has fewer indentations than the previous line.

h) Capital Lines with Punctuations at the Beginning or End

The CFS Cleanup module 530 may use Capital Lines with Punctuations at Beginning or End (CLPBE) logic for line items which have the first part of multiple lines ending with punctuations or the second part of the multiple lines ending with punctuations. The CLPBE logic may have to split labels and values to check that there is a conjunction at the end of label. For example, Cash and cash equivalents at
Beginning of the year 200 500

Cash and cash equivalents 4300 130.
At end of year

To handle such cases, the CLPBE logic may perform the steps as follows:

1) Go into the first part if loop has succeeded. Go to the second part otherwise. Two lines which start with capital letters are found and there is no indentation difference.

2) Detect the pattern. If the pattern is found, do the following:

3) If a value is present at the end, just concatenate lines.

4) If a value is present at the start, concatenate all labels and append the value at the end.

i) Finalizing the Cleanup

The module may copy a line to a new array if the line is not blank. When the module finds the label in the line, the module may remove starting spaces.

IS Cleanup

Income Statement (IS) Cleanup module 528 may implement similar procedures as described in CFS cleanup module 530 except an Identifying State of IS step.

a) General Clean Up

In case of normal lines, the IS cleanup module 528 may perform the exemplary general clean up procedure as described in CFS cleanup module 530.

b) Identifying the Start of IS

The IS Cleanup module 528 may identify a start of an income statement by searching for predetermined phrases. For example, the module may check if the income statement starts with "Revenue" or "Sale." If any of the above phrases is not found, the module may take the first line which has values (not year information) as the start of the income statement. In an embodiment of the present invention, the module assumes that any line with values would have a pattern in which a digit is followed by at least 2 spaces and another digit. The module may make sure the digits do not represent year information.

c) Identifying the End of IS

The IS cleanup module 528 may perform the exemplary general clean up procedure as described in CFS cleanup module 530.

e) Cleaning in between

The IS cleanup module 528 may perform the exemplary general clean up procedure as described in CFS cleanup module 530.

f) Handling Multiple Lines

The IS cleanup module 528 may perform the exemplary general clean up procedure as described in CFS cleanup module 530.

g) Capital Multiple Lines with Indentation

The IS cleanup module 528 may perform the Capital multiple lines with indentation step as described in CFS cleanup module 530.

h) Capital Lines with Punctuations at the Beginning or End

The IS cleanup module 528 may perform the Capital lines with punctuations at beginning or end step as described in CFS cleanup module 530.

i) Finalizing the Cleanup

The IS cleanup module 528 may perform the Finalizing the cleanup step as described in CFS cleanup module 530.

Label/Value Split Module

The Label/Value split module 534 may divide the line items into labels and values. Through cleanup modules 526, 528, 530, all the multiple lines have already been concatenated. The Label/Value split module 534 may find the total number of value columns. The first line item which has a value may be split with three or more spaces. The Label/Value split module 534 assumes that the first line item may give an idea how many years are represented in the financial statement. The Label/Value split module 534 finds the column number at which all the values start. For example, Cash 1000 2000 3000.

In this example, the total number of columns of the line item is 3. The Label/Value split module 534 may find the column number of 1000, 2000 and 3000. The module may maintain the information of a current column. Thus, a column number to indicate the current column may be available. For example, a column number 0 is assigned to the current column which has a value 1000. The module may split the line with three or more spaces and name the first part as Label and the second part as Value Array. If the Label part does not have any small letter, the Label/Value split module 534 assumes the entire line has values. This may be true for line items that have just values and not labels (e.g. totals). If the Label part is just blank but the line contains any small letter, the label may be the entire line. The entire line will be split again. The Label/Value split module 534 may split the Value Array and check if it has lesser number of columns than the required number. If yes, then it means the three spaces added previously are not necessary for splitting the line into the label and the value.

When the Value Array has any small letter, the Label/Value split module 534 may split the Value Array with five spaces to restore the correct label and value array. The Label/Value split module 534 finds the individual values among the values. The Label/Value split module 534 may use two spaces to split the values. If the module determines two spaces is too much, the module may use one space to split. If the total number of columns in the values is equal to the total columns supposed to be in the value side, the module may take the value corresponding to the current column. Otherwise, the original column position may be used to assign the columns correctly. The Label/Value split module 534 may take the column among the values which is present nearest to the current column. If a value is composed of hyphens, the module may replace the hyphens with zeroes. The Label/Value split module 534 may replace numbers with brackets by attaching a negative sign and removing the ending bracket.

Number Logic

The Extract and Cleaning module 500 may use a Number logic 536 designed to get totals which do not have labels. For example,

ASSETS

<line items>

<line items>

<line items>

<line items>

1000

In the above example, the module may not be able to associate 1000 with ASSETS, as the module may not know that 1000 is actually a total. The purpose of the Number logic 536 is to give all the totals and the line item from which the total starts. Thus, the Number Logic 536 may have the output as two arrays. The first array may give the Start_of_Total and the second array may give the End_of_Total. The Number logic 536 would be passed to the Post-Number-Logic which would then find the first unassigned heading, and assign it if any items outside that total do not belong to this total. The Array of values may be an input to the Number Logic. The module may implement the Number logic 536 with the steps as follow: a) initialization b) finding total c) adjusting the total starts for zero values.

a) Initialization

The Number logic 536 may eliminate round-off errors by multiplying all numbers by 1000. When there is an addition of decimal numbers, the Number logic 536 may need different steps to avoid errors. The Number logic 536 gets hold of all the negative numbers in an array and eliminates all blank numbers (not zeroes). The reduced array is copied and kept separately. This is done, as the original array would be changed when finding the totals. But the Number logic 536 also keeps the original array to determine the exact starting and ending point of the totals.

In case of a balance sheet, the Number logic 536 may separate ASSETS and LIABILITIES sections. When the Number logic gets to the liabilities section, it may not be able to get the correct total of Total Liabilities and Stock Holders Equity because each of ASSETS and LIABILITIES sections has its own totals. For example,

| | |
|---|---|
| Total Assets | 1000 |
| (Liabilities section starts) | |
| <Line item> | 5 |
| <Line item> | 10 |
| * | (Total till now is say 800) |
| <Line before> | 200 |
| <Total L & SE> | 1000 |

In the above example, the Number logic 536 may find line items until the values adding up to 1000. The Number logic 536 may take <line before> item as a total although <line before> item is not a total. To prevent such a mistake, the Assets and Liabilities sections are divided. Accordingly, the Number logic 536 may find "Total L & SE" as a total of liability section. In case of CFS and IS, the extra step may not be necessary.

Finding Totals

The Number logic 536 may implement a Finding Totals logic with the steps as follow:
1) Add the first two terms, check against the third term.
2) If a total is found, delete first and second terms and keep the third term and continue with third and fourth with fifth and so on.
3) If a total is not found, check if first term−second term=third term.
4) If a total is still not found, then check
   if first term+second term+third term=forth term,
   first term+second term−third term=forth term,
   first term−second term−third term=forth term and so on.

The Number logic 536 may implement several loops for the logic. The first loop checks for the Right Hand Side (RHS) of the total. The second provides the Left Hand Side (LHS) of the total. The third loop provides the negative part. The third loop flips numbers from the end. The third loop flips numbers which are negative numbers without having negative signs. This procedure may be needed to make total calculation easy since financial statements do not contains explicit negative signs. The forth loop may be used to change the sign back after it was flipped by the third loop. Flipped numbers may be reverted back by the forth loop. In the third loop, values representing negative values may be converted to negative numbers. When the Number logic 536 finds a total, it determines the position of the total. The position may be determined based on the original value array already stored previously. The Number logic may check only the numbers after the previous total. The Number logic 536 also finds a startpoint of the total. After the total is found, the Number logic 536 removes all the line items, which had added up to the total retaining the total alone. The module changes the loop variables of the first loop and the second loop accordingly. The numbers which have been flipped in the third loop are changed back to have their original signs. The Number logic 536 may check exceptional cases. For example,

| | |
|---|---|
| <line item1> | |
| * | |
| * | |
| Total current Assets | 10000 |
| * | |
| * | |
| Total non-current Assets | 20000 |
| Total Assets | 30000 |

In the above example, although "Total assets" would mathematically begin from 10000, the total should start from the line item 1. The Number logic 536 may use extra logic to check if the starting point of the total represents the total itself. In the above example, the module first finds "Total current assets" as the starting point and finds that it is a total of something. Then, the starting point may be shifted to the start of "Total current Assets", which is line item 1.

Adjusting the Total Starts for Zero Values

The Number logic 536 may check if the line that follows the total is also a total, indicating that it might also be a total but with zeroes as the additional values. In such a case, the Number logic 536 may initialize the start and end of totals. Then, it passes zero values so as to have the total to start from the line after the non-zero value. If the line that follows the total is not a total, the Number logic 536 may check the presence of zero value lines above the start of total. If any zero value is present, the Number logic 536 decrements the start of the total to start from the previous line with a zero value. The Number logic 536 continues the above described steps until it gets to a non-zero value.

Tag Statement Module

Figure 6:
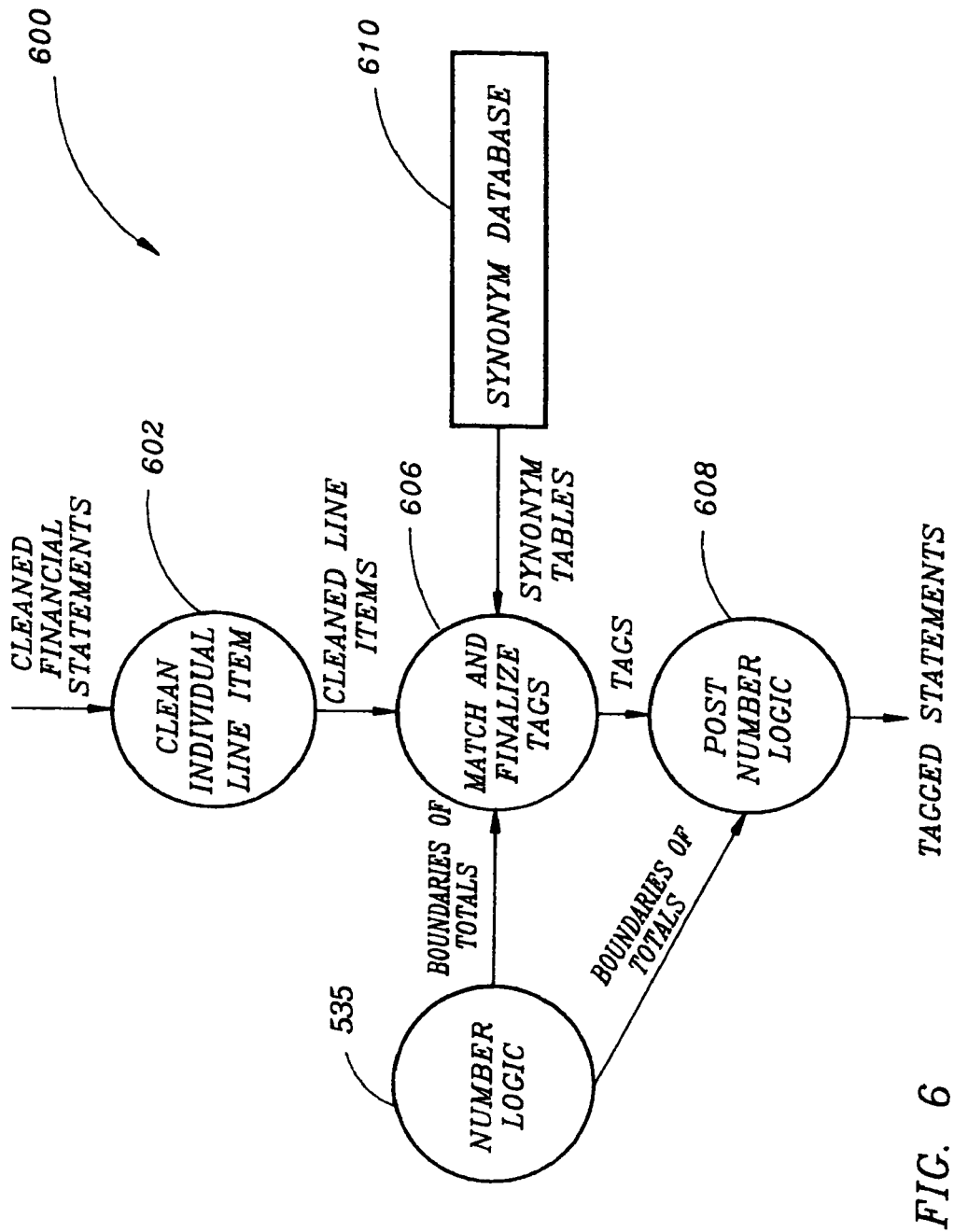
FIG. 6 is a data flow diagram describing a Tag Statement Module the intelligent agent of the system shown in FIG. 1, in accordance with an exemplary embodiment of the present invention.

Referring again to FIG. 3, a Tag Statement Module 316 may be responsible for tagging the three financial statements 315 extracted from the raw report 310. In this module, each synonym is matched to all the line items in the statements, and respective data structures are updated with the various matches. Referring now to FIG. 6, the Tag Statement Module 600 is described in greater detail. The Tag statement module 600 is responsible for tagging the three financial statements which are extracted and cleaned via previously described modules. The Tag statement module 600 takes a label array, a value array, a heading flag array, units, a type of statement, a company name and a date of report as inputs. First, for the XBRL taxonomy, three synonym tables (one each for Balance Sheet, Cash Flow statement and Income Statement) from a synonym database 610 are loaded into separate data structures.

XBRL Taxonomy

Explanation of some terms used as tags in XBRL taxonomy are as follow:

Predecessor: A tag is considered to be the predecessor of another (child tag) if it lies in the same branch of the taxonomy tree as the child tag and is also at least one level above the child tag. For example, the tag "assets.currentAssets" in a balance sheet is a predecessor to the tag "currentAssets.cash".

Successor: A tag is considered as a successor to another tag if it is in the same branch of the taxonomy tree and also at least one level below that tag. For example, the tag "currentAssets.cash" is a successor to the tag "assets.currentAssets".

Closest Common Predecessor (CCP): A tag is said to be a closest common predecessor of a list of tags if it is a predecessor to the entire list of tags and there is no child of the CCP tag that is also a predecessor to the list of tags.

Address of an element in the taxonomy: The logic of the tagging program requires frequent lookups in the taxonomy tree to find predecessors, successors or closest common predecessors. An extra address field in the taxonomy table is added which may uniquely represent an element in the tree using its level and order and also the level and order of all elements above it in that branch. So for example "Current Assets" in the balance sheet may have an address of "1xOx2x4xj'x1x4x1", while its parent "Assets" may have an address "1xOx2x4x3xI".

Data Structures

Data structures used in the Tag Statement Module 316 may include TAXON, SYN, FINAL_TABLE, REF, ALT1/ALT2 and the like.

Exemplary data structures are defined as follows: TAXON (Hash of Hashes) is maintained to store the XBRL taxonomy in the system memory. A Tag is the key of the main hash. The elements of the main hash (Each of them is a hash too) include 1) Parent: Tag of the parent of the current element, 2) Level: Level in the taxonomy, 3) Order: Order in the current level, 3) Address: Address of the current element in the taxonomy, 4) Weight: Weight of element, 5) Tag_Type: Indicates what taxonomy the tag is part of.

SYN (Array of Hashes) is maintained for each financial statement to store synonym tables. Each array element contains hashes including Tag, Synonym and the like.

FINAL_TABLE (Array of Hashes) is maintained for each financial statement. Each array element contains hashes including 1) Orig_Label: Original label found in the financial statement, 2) Orig_Value: Original value found in the financial statement, 3) Label: Modified label after cleanup, 4) Value: Modified value, 5) Flag: Flag indicating if line item is a total, heading or line item starting with keyword "Less", 6) Ref: Reference to an Array of hashes (REF) that contain details about the tags that matched to the line item, 7) Assigned_Tag: Final tag that is assigned to the line item, 8) Possible_Tag: A Tag that is set using the closest common predecessor logic, it is assigned only after some extra checks, 9) Alt1: Reference to an Array of Hashes (ALT1) that contains details about the first alternative to the line item, 10) Alt2: Reference to an Array of Hashes (ALT2) that contains details about the second alternative to the line item, 11) Pred_Array Ref: Reference to an Array of hashes (PRED_ARRAY), it exists only if the tag is assigned using the predecessor logic.

REF (Array of hashes) is maintained for each line item to hold the information about the possible tags that can be assigned to it. It has hashes including 1) Tag: A Tag to which the line item matched, 2) Match_Type: 0 if an exact match, length of the match if it is a partial match.

ALT1/ALT2 (Array of hashes) is maintained for each alternative line item to hold information about possible tags that can be assigned to it. It has fields including 1) Label: Alternative label 2) Ref: Reference to an Array of hashes—ALT-REF that contains details about tags that matched to the alternative line item. This structure is similar to the one maintained for the line item —REF The Tag Statement Module 600 is started with a Clean Individual Line item Module 602. The financial statement has been cleaned and stored in the Label array via previous modules. The clean Individual Line item Module 602 cleans each line item in the financial statement. For example, all punctuation marks are removed from the line item and text in brackets is cleaned of any stop words. All digits are removed from the line item. The line item is converted to small case. Any spaces at the start or end of the line item are removed. After the various cleaning steps are completed, the end of the line item is again cleaned of any digits or stop words. The module may update Flags in the FINAL_TABLE structure to indicate whether the line item is a total (Flag=1), heading (Flag=3) or if it starts with the keyword "Less" (Flag=2). Finally, the line item is split into two alternatives if it has one or more "and" terms. At the end of the line item cleanup program, the FINAL_TABLE structure is updated.

The Tag Statement Module 600 uses the Number logic 536 to find out the totals in the financial statement. A table type, a value array, a head flag or the like may be provided as inputs for the Number logic 536. The arrays total_start and total_end are updated with the start-point and end-point of totals. For each total found, the corresponding flag is set in the FINAL_TABLE structure.

The Match and Finalized Tags 606 may loop through the synonym table that is stored in the SYN structure. Each synonym is matched to all the labels in the FINAL_TABLE structure. Corresponding fields (REF) are updated in the FINAL_TABLE structure for each match (a matched tag, a type of match and the like). If there are alternatives for the line items, each alternative is also matched against the synonym table and the data structures (ALT-REF) are updated accordingly. Tags are finally assigned to each line item among the matches. There are many possible scenarios here depending on the number of exact and inexact matches. When there are no exact and inexact (partial) matches, the module may log this as a new synonym. When there is only one exact match, the module may take it as a final tag. When there are more than one exact match, the Match and Finalized Tags 606 may use the PRED_LOGIC subroutine to determine a correct tag.

In case of no exact match and more than one inexact match, the Match and Finalized Tags 606 may take all the exact matches from the alternatives into consideration. The module walks through possible cases. For example, when the module finds one inexact match and zero matches on alternatives, the module may take the tag of the inexact match. When there is more than one inexact match and zero matches on alternatives, the module checks whether all inexact matches point to same tag. Then, the module takes the tag. Otherwise, the module takes the longest partial match (a Match type field in the REF structure has the length of the match). If the partial matches are of same length, the module uses the PRED_LOGIC subroutine. When the module finds one or more inexact matches and many exact matches on alternatives, the module finds the tag with the smallest address among all the choices. This is done because either the current tag or its predecessor has the highest probability of being the closest common predecessor (it is at a much higher level in the tree than the rest of the choices). The module finds out the Closest Common Predecessor of all the matches and stores the tag in the possible tag field.

The next step is to finalize all the possible tags if any. The possible tags are found via the closest common predecessor logic. The Tag Statement module 600 loops through the FINAL_TABLE structure and checks if the possible tag or any of its successors is assigned to any other line item. The Tag Statement module 600 assigns the possible tag to the line item only if the check is valid. Then, the Tag Statement module 600 may verify whether all tags are assigned correctly via the predecessor logic. In an embodiment of the present invention, Verify_Pred_Logic subroutine may be used for such verification. Once all the tagging is done, the Tag Statement module 600 may use Post Number logic 608 to tag totals that do not have labels and also do some verification.

The Tag Statement module 600 may be implemented by various PERL modules and programs. In a particular embodiment of the present invention, Extract_And_Tag.pl is a program that calls the actual tagging program. It maintains all the data structures required by the extraction and tagging programs. Database_Connection.pl is a program makes a connection to the SQL server database located on the server. It loads the entire XBRL taxonomy stored as a table into memory (a Hash of Hashes structure may be used to store the taxonomy in memory). It also loads the three synonym tables into memory (A hash of hashes is used to store the synonyms too). Line_Item_Cleanup.pl is a program that cleans the text in each line item, flips signs of values, splits line items into alternatives, and updates flags corresponding to each line item. Post_Number_Logic.pl is used to tag totals with no values and also to propose tags for line items that do not have an assigned tag yet. Tag Table.pl is a program that does the actual tagging. It calls the Number_Logic, Line_Item_Cleanup, Post_Number_Logic programs. Those of skill in the art will appreciate that various other programs, functional modules, and the like, may be used to implement the above described modules without departing from the scope and intent of the present invention.

Closest Common Predecessor

A Closest Common Predecessor logic is designed to find out the closest common predecessor of a list of tags. Inputs to the Closest Common Predecessor logic include a reference to an array of tags, a tag with the smallest address among all the list of tags and the like. First, the Closest Common Predecessor logic determines the closest common predecessor to all the matched tags by checking whether the tag with the smallest address is a predecessor to all the tags in the list. The Closest Common Predecessor logic updates the FINAL_TABLE structure with the tag as a possible tag. It requires some additional checks before it is finally assigned to the line item. If the tag with the smallest address is not a predecessor then the subroutine repeats the above steps with the tag's parent. The Closest Common Predecessor logic may continue until a predecessor is found or if the root of the tree is reached.

Predecessor Logic

Predecessor logic may include a Predecessor subroutine, an Exclude children subroutine and a Check_successors subroutine. The Predecessor logic may be used to find the best tag among a list of tags, using the tag of the closest line item above the line item on the consideration. The Predecessor logic may take variables as inputs, including a reference to the line item in the FINAL_TABLE structure, a reference to the array of hashes REF containing information about the matched tags, a match choice that indicates whether to use exact matches or inexact matches, a tag of the previous line item, and an exclude children flag which, if set, indicates to do the reverse of predecessor logic.

The Predecessor logic may utilize a data structure such as PRED_ARRAY or the like. PRED_ARRAY (Array of hashes) is maintained to store information of possible matches. It includes fields such as a Tag and a Pred_Flag. The Tag field may contain a possible tag and the Pred_Flag field may contain the difference in levels of the parent tag and the possible tag plus one.

The Predecessor Logic module may update the PRED_ARRAY with the list of possible tags depending on a match choice. If the exclude children flag is set, all children of the parent tag from the list of choices may be eliminated. This is done when the parent tag is a total. If any of the choices is a successor to the parent tag then the Pred_Flag is set to −1. The Predecessor logic checks if the parent tag is a predecessor of any of the possible tags. Then, the Predecessor logic updates the Pred Flags of all possible tags in the PRED_ARRAY to show how close the possible tag is to the parent tag (1+Level of possible tag−Level of parent tag). The Predecessor logic checks if the parent tag is a predecessor to at least one of the possible tags. The Predecessor logic may repeat the above steps with the parent of the parent tag until the Predecessor logic reaches a stage where the parent tag is a predecessor to at least one of the possible tags or the parent tag becomes the root of the tree. If the parent tag (or any of its predecessor's) is not a predecessor to any of the possible tags, the Predecessor logic returns back to the beginning of the procedure. If the parent tag is a predecessor to only one possible tag, the Predecessor logic returns the tag as the final tag of the line item. If the parent tag is a predecessor to more than one of the possible tags, then the module takes the possible tag that is closest in level (i.e. choose the tag that has the least positive Pred_Flag value). The Predecessor logic checks the flag of the current line item. If the current line item is not a heading, the subroutine adds a new element to the FINAL_TABLE, pred_array_ref (a reference to the PRED_ARRAY). Accordingly, the module performs a final check on all tags that are assigned using the predecessor logic.

Verify_Predecessor_Logic

A Verify_Predecessor_Logic (including a Verify_pred_logic subroutine and a Verify_tag subroutine) is designed to verify whether the tags assigned by the predecessor logic are correct. Sometimes, the database may contain incorrect tags. For example, "cash and cash equivalents" may have tags as follows:

CashAndCashEquivalents.cash
CashCashEquivalentsAndShort-
TermInvestments.cashAndCashEquivalents
CurrentAssets.CashCashEquivalentsAndShortTermInvestments The correct tag may be the second one, but the database may include the first or third one because the context in one of the various companies forced the module to tag "cash and cash equivalents" at a higher or lower level than the desired. The predecessor logic may select the third tag because the third tag is higher in the tree compared to the other two tags. In such a case, the Verify_Predecessor_Logic performs an additional verification step to identify incorrect tags and try to rectify the problem. The Verify_Predecessor_Logic may loop through the FINAL_TABLE structure and run the verify_tag subroutine for each tag that is assigned using the predecessor logic (all such items have the pred_array set). If the tag passes the check (verify_tag returns 1) then the logic may move on to the next line item in the FINAL_TABLE that has a tag assigned through the predecessor logic. If the verification fails (venfy_tag returns −1) then the logic may try the verification on the other choices from the pred_array. If no tag passes the verification, the Verify_Predecessor_Logic removes the assigned tag. If any other tag passes the verification, the originally assigned tag (failed tag) is replaced by the new tag (passed tag). The verify_tag subroutine may take a Tag to validate and a Line item number as inputs. The verify_tag subroutine loops through the FINAL_TABLE structure starting from the line item that is being verified to a maximum of five line items below it. The verify_tag subroutine checks whether any of the 5 line items have tags assigned already. The verify_tag subroutine makes sure that the tags are not children of the tag to validate. Headings may be excluded from such checks. If any line item is found to have a tag that is a child of the tag to validate, the tag has failed the check (−1 is returned back to calling program). If no such tag is found, the tag has passed the check and 1 is returned back to the calling program.

Post Number Logic

Post Number Logic 608 may be used to tag line items which are totals. Subroutines used by the Post Number Logic 608 may include Total_Head_Match, Find_msp_tag, Procedure_1, and Validate_tag. The Post Number Logic 608 matches all total line items with their headings. For each total found (line item with a flag set to 1 in the FINAL_TABLE structure), the Post Number Logic 608 may get an unassigned heading. All unassigned headings have a flag value set to 3. If a heading is assigned to the total, tags should be same and the flag value is changed to 4 plus the line number of the total line item. The Number logic 536 fills two arrays containing line numbers one each for a start of a total and an end of a total. The Find_Msp_Tag subroutine is called for each total that is found by the Number logic.

The Post Number Logic 608 finds the closest common predecessor of all line items that are part of the current total, which is called as the most specific (MSP) tag. If an MSP Tag has been found in the previous step, the Post Number Logic 608 validates it by checking whether all tags outside the boundaries of the total are not children of the MSP Tag. If the validation fails, the Post Number Logic 608 reports an exception and continues with the next total. If the validation succeeds, the Post Number Logic 608 proceeds further. If the MSP Tag is not found or if it is found and validated, the Post Number Logic 608 proceeds by checking if there is a label for the total. If a label is present for the total line item and is already assigned a tag, the Post Number Logic 608 calls Procedure_1 with the tag of the total. If a label is present and is not tagged, the Post Number Logic 608 assigns the MSP Tag to the line item and logs it as a new synonym. If a label for a total is not present, the Post Number Logic 608 gets the first unassigned heading (loop above the total line item and look for lines that have flag set to 3). If the heading line is present and tagged, the Post Number Logic 608 calls the Procedure_1 with the tag of heading as the input. If the heading line is present and is not tagged, the MSP Tag is assigned to the total line item and also logged as a new synonym. If no unassigned heading is found, the MSP Tag is assigned to the total line item. If the MSP Tag is not found, the total may be passed to the Procedure_1 subroutine, which would either be the heading tag or total tag. If the MSP Tag is found and is the same as the total/heading tag passed, the MSP Tag is assigned to the total line item and the total is assigned to the heading (By setting the correct value of flag in the heading line item).

The Procedure_1 subroutine proposes tags to any untagged line items within the boundaries of the total. If an input tag (total/head tag passed) is a predecessor to the MSP Tag, then the Procedure_1 runs a validation check to see whether the input tag has any of its children outside the total boundaries. If the input tag passes this check, the Procedure_1 assigns it as the tag to the total line item. Otherwise, the Procedure_1 assigns the MSP Tag as the tag to the total line item and logs an exception to check if this is correct. If an input tag (total/head tag passed) is not a predecessor to the MSP Tag, then the procedure_1 assigns the MSP Tag to the total but logs an exception to verify it.

Referring back to FIG. 3, a Display module 322 may display the resulting financial statements in XBRL. It may also create links on an html page for users to view the resulting financial statements in various formats including a raw report, an XBRL report, an Excel report and the like. In an embodiment of the present invention, the XBRL document may conform to the XBRL version 1.0 Taxonomy and specification.

Display Module

The Display module 322 generates financial statements in XBRL formats from the FINAL_TABLE structure passed to the Display module from the Tag Statement module 316. The Display module 322 also creates links on an html page for users to view the financial statements in various formats such as an original (maybe text/html) report, an XBRL, a styled, an Excel or the like. In a particular embodiment of the present invention, the Display module 322 writes out the root tag with attributes to the XBRL document as follows:
 Entity: Company Name
 Units: Currency of values Scale
 Factor: Multiplication factor for values
 Precision
 Decimal Pattern
 Format Name.

The Display module 322 loops through the FINAL_TABLE structure and it creates an eXtensible Markup Language (XML) group element with the XBRL tag as an attribute for each line item from the FINAL_TABLE structure. The XML group element has two nested children such as a Label child and an Item child. The Label child may contain a label for a line item and the Item child may contain a value for the line item and also a date as an attribute. In an embodiment of the present invention, the Spreadsheet:: WriteExcel perl module is used to create MICROSOFT® EXCEL® documents. It creates an EXCEL® spreadsheet and writes down the company name, date and units information. For each line item, the module also creates a row in the EXCEL® spreadsheet and a cell each for the tag of the line item, the label and the value. Programs that perform tasks in this module are Print_Output pl which creates the three financial statements in XML and also in EXCEL® formats and Links.p which generates the links to display the financial statements (in various formats—original, XBRL, styled and EXCEL®).

It should be appreciated that the FRAANK system may be utilized to produce various outputs based on business information available via the Internet resources. For example, the FRAANK system may be utilized to parse the text of retrieved business information such as 10K reports from the EDGAR and then identify "Items", "Footnotes to Financial Statements", "Independent Auditor's Report" or the like. Upon the request of users, the FRAANK system may capture information of "Items", "Footnotes to Financial Statements", "Independent Auditor's Report" or the like, from the retrieved business information. The captured information is then parsed into its various elements or line items and the line items identified by associating or matching the element or line item to an appropriate identification tag such as an XBRL taxonomy tag, or the like. The information tagged is used to generate a display of a desired output.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the FRAANK information system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for generating financial statements, comprising: a computing device implementing an agent for generating a financial statement, the agent performing operations including: receiving financial report information for an entity from a data source via a communication network; identifying at least one table containing financial statement information from the retrieved financial report information; parsing at least one identified table into one or more table elements; assigning an identification tag to a first table element; determining that one or more values associated with one or more table elements including at least the first table element and a second table element form a total value associated with a third table element; assigning an identification tag including at least a portion of the identification tag assigned to the first table element to at least one of the second table element and the third table element; and generating a financial statement using one or more identification tags associated with at least one of the first table element, the second table element and the third table element.

2. The system as claimed in claim 1, wherein the assigning an identification tag to a first table element comprises:
    assigning an identification tag to a first table element according to a synonym database mapping the first table element to the identification tag.

3. The system as claimed in claim 1, wherein the agent further performs an operation:
    determining that at least one of the second table element and the third table element has synonym database mappings to two or more identification tags.

4. The system as claimed in claim 1, wherein the agent further performs an operation:
    determining that the third table element does not have a synonym database mapping to an identification tag; and
    wherein the assigning an identification tag including at least a portion of the identification tag assigned to the first table element to the third table element further comprises:
        assigning an identification tag including at least a portion indicating that the third element is a total.

5. The system as claimed in claim 1, wherein identification tags are eXtensible business reporting language (XBRL) tags.

6. The system as claimed in claim 1, wherein the assigning an identification tag including at least a portion of the identification tag assigned to the first table element to at least one of the second table element and the third table element comprises:
    assigning a tag including at least a portion of an identification tag of a closest common predecessor (CCP) tag associated with the first table element to at least one of the second table element and the third table element.

7. The system as claimed in claim 1, wherein the assigning an identification tag including at least a portion of the identification tag assigned to the first table element to at least one of the second table element and the third table element comprises:
    assigning an identification tag including at least a portion of an identification tag associated with a table element in a parental relationship with the first table element according to an identification tag taxonomy tree to at least one of the second table element and the third table element.

8. The system as claimed in claim 1, further comprising a local database for storing the received financial report information for access without use of the communication network.

9. The system as claimed in claim 1, further comprising a web server for providing a web page for at least one of receiving input of name information for the entity from a user and allowing the user to view the financial statement generated by the agent in a desired format.

10. The system as claimed in claim 1, wherein the data source comprises a database cross-referencing name information for entities with financial report information for the entities.

11. The system as claimed in claim 10, wherein the database cross-referencing name information for companies with financial report information for the companies comprises the Electronic Data Gathering, Analysis, and Retrieval (EDGAR) system provided by the United States Security and Exchange Commission (SEC).

12. The system as claimed in claim 1, wherein the data source comprises a web site provided by the entity.

13. The system as claimed in claim 1, wherein the data source comprises an external agent source.

14. The system as claimed in claim 1, wherein the financial statement comprises at least one of a business statement, an income statement, and a cash flow statement.

15. The system as claimed in claim 1, wherein the entity comprises a company having stock traded in a public stock exchange.

16. A method for generating financial statements for entities, comprising:
    receiving financial report information for an entity from a data source via a communication network;
    identifying at least one table containing financial statement information from the retrieved financial report information;
    parsing at least one identified table into one or more table elements;

assigning an identification tag to a first table element;

determining that one or more values associated with one or more table elements including at least the first table element and a second table element form a total value associated with a third table element with a computing device;

assigning an identification tag including at least a portion of the identification tag assigned to the first table element to at least one of the second table element and the third table element; and generating a financial statement using one or more identification tags associated with at least one of the first table element, the second table element and the third table element.

17. The method as claimed in claim 16, wherein the assigning an identification tag to a first table element comprises:

assigning an identification tag to a first table element according to a synonym database mapping the first table element to the identification tag.

18. The method as claimed in claim 16, further comprising:

determining that at least one of the second table element and the third table element has synonym database mappings to two or more identification tags.

19. The method as claimed in claim 16, further comprising:

determining that the third table element does not have a synonym database mapping to an identification tag; and wherein the assigning an identification tag including at least a portion of the identification tag assigned to the first table element to the third table element further comprises:

assigning an identification tag including at least a portion indicating that the third element is a total.

20. The method as claimed in claim 16, wherein identification tags are eXtensible business reporting language (XBRL) tags.

21. The method as claimed in claim 16, wherein the assigning an identification tag including at least a portion of the identification tag assigned to the first table element to at least one of the second table element and the third table element comprises:

assigning a tag including at least a portion of an identification tag of a closest common predecessor (CCP) tag associated with the first table element to at least one of the second table element and the third table element.

22. The method as claimed in claim 16, wherein the assigning an identification tag including at least a portion of the identification tag assigned to the first table element to at least one of the second table element and the third table element comprises:

assigning an identification tag including at least a portion of an identification tag associated with a table element in a parental relationship with the first table element according to an identification tag taxonomy tree to at least one of the second table element and the third table element.

23. The method as claimed in claim 16, further comprising:

storing the received financial report information in a local database for access without use of the communication network.

24. The method as claimed in claim 16, further comprising:

providing a web page for at least one of receiving input of name information for the entity from a user and allowing a user to view a generated financial statement in a desired format.

25. The method as claimed in claim 16, wherein the data source comprises a database cross-referencing name information for entities with financial report information for the entities.

26. The method as claimed in claim 25, wherein the database cross-referencing name information for companies with financial report information for the companies comprises the Electronic Data Gathering, Analysis, and Retrieval (EDGAR) method provided by the United States Security and Exchange Commission (SEC).

27. The method as claimed in claim 16, wherein the data source comprises a web site provided by the entity.

28. The method as claimed in claim 16, wherein the financial statement comprises at least one of a business statement, an income statement, and a cash flow statement.

29. The method as claimed in claim 16, wherein the entity comprises a company having stock traded in a public stock exchange.

* * * * *